United States Patent
Battenfeld et al.

(10) Patent No.: US 8,516,872 B2
(45) Date of Patent: Aug. 27, 2013

(54) CRIMPING PLIERS

(75) Inventors: Kurt Battenfeld, Ebsdorfergrund/Wittelsberg (DE); Thomas Glockseisen, Düsseldorf (DE)

(73) Assignee: WEZAG GmbH Werkzeugfabrik (DE)

( * ) Notice: Subject to any disclaimer, the term of this patent is extended or adjusted under 35 U.S.C. 154(b) by 367 days.

(21) Appl. No.: 12/892,074

(22) Filed: Sep. 28, 2010

(65) Prior Publication Data

US 2011/0072593 A1   Mar. 31, 2011

(30) Foreign Application Priority Data

Sep. 30, 2009  (EP) .................................... 09171826

(51) Int. Cl.
*B21D 37/14*     (2006.01)
*B25B 7/22*      (2006.01)

(52) U.S. Cl.
USPC ................... 72/409.16; 72/409.11; 72/409.01

(58) Field of Classification Search
USPC ................. 72/409.1, 409.11, 409.12, 409.14, 72/409.16, 414, 415; 81/421, 422, 424, 9.4; 7/128–134, 107; 140/105, 106
See application file for complete search history.

(56) References Cited

U.S. PATENT DOCUMENTS

| | | | |
|---|---|---|---|
| 4,794,780 A | 1/1989 | Battenfeld | |
| 4,892,015 A | 1/1990 | Beetz | |
| 5,063,770 A | 11/1991 | Chen | |
| 5,153,984 A | 10/1992 | Beetz | |
| 5,187,968 A | 2/1993 | Beetz | |
| 5,285,703 A | 2/1994 | Carson | |
| 5,894,617 A | 4/1999 | Liou | |
| 5,913,933 A | 6/1999 | Beetz | |
| 6,053,025 A | 4/2000 | Beetz | |
| 6,155,095 A | 12/2000 | Beetz | |
| 6,286,358 B1 | 9/2001 | Beetz | |
| 6,289,712 B1 | 9/2001 | Beetz | |
| 6,427,275 B1 | 8/2002 | Hung | |
| 6,474,130 B2 | 11/2002 | Battenfeld | |
| 6,612,147 B2 | 9/2003 | Beetz | |
| 6,877,228 B2 | 4/2005 | Beetz | |
| 6,910,363 B2 | 6/2005 | Beetz | |
| 7,155,954 B2 | 1/2007 | Battenfeld | |
| 2006/0254057 A1 | 11/2006 | Houseman | |
| 2008/0163664 A1 | 7/2008 | Battenfeld | |
| 2009/0044410 A1 | 2/2009 | Battenfeld | |
| 2009/0183547 A1 | 7/2009 | Battenfeld | |
| 2009/0193942 A1 | 8/2009 | Battenfeld | |
| 2009/0217791 A1 | 9/2009 | Battenfeld | |

FOREIGN PATENT DOCUMENTS

| | | |
|---|---|---|
| DE | 92 08 845 U1 | 9/1992 |
| DE | 196 10 899 C1 | 7/1997 |
| DE | 44 27 553 C2 | 6/1998 |
| DE | 197 09 639 A1 | 9/1998 |

(Continued)

*Primary Examiner* — Debra Sullivan
(74) *Attorney, Agent, or Firm* — Thomas | Horstemeyer, LLP

(57) ABSTRACT

The present invention relates to crimping pliers for crimping a workpiece. The crimping pliers comprise two hand levers. At the crimping pliers a first tool builds a crimping tool and comprises two crimping jaws located at a head of the pliers. The crimping jaws are linked by a transfer mechanism with the two hand levers. The invention suggests providing a second tool. The second tool comprises a working area, wherein the working area is located between the two hand levers. The second tool is solely mounted with a first hand lever of the two hand levers. The second hand lever comprises a contact surface cooperating with a contact surface of the second tool. The contact of the two contact surfaces is used for transferring an activating force from the hand levers to the second tool.

11 Claims, 6 Drawing Sheets

(56) References Cited

FOREIGN PATENT DOCUMENTS

| | | |
|---|---|---|
| DE | 198 34 859 C2 | 1/2001 |
| DE | 201 00 031 U1 | 5/2002 |
| DE | 197 53 436 C2 | 10/2002 |
| DE | 102005003617 B3 | 6/2006 |
| DE | 102005003615 B3 | 9/2006 |
| DE | 202008003703 U1 | 5/2008 |
| DE | 102008017366 A1 | 10/2009 |
| DE | 102009001949 | 9/2010 |
| EP | 0 471 977 B1 | 6/1995 |

CRIMPING PLIERS

CROSS REFERENCE TO RELATED APPLICATIONS

This application claims priority to co-pending German Patent Application No. EP 09 171 826.2 entitled "Zange", filed Sep. 30, 2009.

FIELD OF THE INVENTION

The present invention generally relates to crimping pliers building a tool for crimping a workpiece at a head of the crimping pliers, wherein the tool is activated by hand levers.

BACKGROUND OF THE INVENTION

German Utility Model DE 201 00 031 U1 discloses crimping pliers. The workpiece crimped with these crimping pliers is a cable connector crimped with an end of a cable. The tool of these crimping pliers used for the crimping process is built with two crimping die inserts being mounted with crimping jaws located at the head of the pliers. The crimping jaws are linked for being pivoted with an actuation of the hand levers. The crimping die halves each comprise a plurality of nest halves. A pair of crimping die inserts builds a plurality of nests for crimping cable connectors having different cross sections. The German Utility Model also mentions the option of coupling a base body of the crimping pliers with different pairs of crimping die inserts and of using a tool case or box carried by the technician, wherein the tool case is used for housing both the base body as well as a plurality of crimping die inserts. The German Utility Model suggests storing unused crimping die inserts in guiding rails or slots being located at the inner surfaces of the hand levers facing towards each other. The crimping pliers build a unit ready for use, wherein one pair of crimping die inserts is inserted and used in the head of the pliers, whereas the other crimping die inserts are stored in at least one hand lever. The crimping die halves are introduced from the rear end of the hand levers into the guiding rails and are rested with a resting unit, here a resting sphere, in a plurality of axial positions in the guiding rails.

U.S. Pat. No. 5,285,703 discloses crimping pliers, wherein the actually used crimping dies are screwed with the crimping jaws. Presently unused pairs of crimping dies having differing geometries are screwed with threaded bores of the hand levers.

The applicant of the present patent application distributes crimping pliers labeled CE10, CE21, CE30 and CE31. Here, the crimping pliers are built with two halves, wherein each half integrally builds both the hand levers and the crimping die jaws. The halves are each provided with a crank between the crimping die jaws and the hand levers. At the two cranks the two halves are pivotably linked by a pivoting bolt. The crimping pliers of these types provide a multifunctional use:
  in the front end region, the crimping jaws build cutting elements for cutting a cable;
  between the aforementioned cutting elements and the cranks the crimping jaws build crimping die halves used for crimping sleeves, fittings or contact elements;
  between the regions gripped by the hand of the user and the cranks the hand levers build stripping nest halves with a plurality of cutting edges each having an approximately semi-circular cutting contour. In a closed operating state of the crimping pliers the related stripping nest halves combine to a stripping nest. For stripping a cable the cable is introduced into the nest in a direction transverse to the main extension plane of the pliers and transverse to the plane, wherein the hand levers are pivoted. With a closing movement of the hand levers, the cutting edges of the chosen nest cut into the insulation at an end region. In the closed operating state, the cable end is stripped, i.e. an insulation is partially removed by pulling the cable away from the pliers. The pliers build a plurality of differing nests for stripping cables having differing diameters.

The applicant of the present application also distributes crimping pliers labeled CG42, CG44, CG65 and CG66. These pliers use a toggle lever mechanism with a rested dead center. Here, the cutting edges and nest halves are not integrally built by the hand levers or toggle lever mechanism. Instead the cutting edges and nest halves are built by separate components made of sheet metal. The separate components are each riveted with a hand lever or a toggle lever.

US 2006/0254057 A1 discloses a multifunctional tool. The crimping jaws are moved towards each other by manually pivoting the hand levers for crimping a fitting between the two crimping jaws. The tool is used for crimping plastic pipes for lawn sprinkler systems. Furthermore, a cutting device is integrated into the multifunctional tool for cutting the tubes made of plastic. A cutting lever is pivotably linked with a first hand lever. On both sides of the link, the cutting lever builds cutting lever parts. A first cutting lever part extends into the intermediate space between the hand levers. Here, the first cutting lever part builds an actuating mechanism for the cutting device. For that purpose, the first cutting lever part carries a role rolling along an actuation surface built by the second hand lever. Accordingly, a pivoting movement of the hand levers towards each other coincides with a pivoting movement of the cutting lever. The second cutting lever part extends to the outside of the multifunctional tool and builds a cutting knife. The cutting knife in an open operating state for opened hand levers has an orientation approximately transverse to the longitudinal extension of the first hand lever. With the closing movement of the hand levers, the second cutting lever part and the cutting knife are pivoted versus an orientation parallel to the first hand lever. The first hand lever at the outside builds a nest or opening housing the tube made of plastic to be cut. With the afore mentioned pivoting movement of the cutting lever, the cutting knife enters the nest and cuts the tube.

U.S. Pat. No. 6,427,275 B1 discloses a tool used for stripping, cutting and crimping a coaxial cable. A hand level is pivotably linked with a housing at a pivoting joint. Both the housing and the hand lever comprise cutting elements located adjacent to the pivoting joint. With a pivoting movement of the hand lever versus the housing, the cutting elements are moved towards each other for cutting the coaxial cable. The cutting elements build a first tool. In a through-recess of the housing having an orientation transverse to the plane of movement of the hand lever, a seat for the coaxial cable is guided for a translational movement relative to second cutting element. The second cutting element comprises a concave cutting edge designated for stripping the cable. A spring element biases the seat relative to the cutting element into an open state suitable for allowing the cable to be introduced between the second cutting element and the seat. With a movement of the hand levers versus the housing over a large partial stroke, the relative position of the seat with respect to the cutting element does not change. Only at the final part of the closing stroke an inner contact surface of the hand lever comes into contact with a stem coupled with the seat. In the small final partial stroke of the hand lever, the hand lever moves the stem and the seat with the result that the cutting element cuts into the insulation of the cable. The recess of the housing with the stem, seat and cutting element builds a second tool used for stripping the cable. At the front of the housing another seat is built designed for housing a fitting. This seat is part of a third tool used for crimping the fitting. The crimping movement is caused by a cam pivoted with the hand lever and a plunger mechanism sliding along the cam.

Further prior art is known from U.S. Pat. Nos. 5,894,617 A, 5,063,770 A and DE 92 08 845 U1.

SUMMARY OF THE INVENTION

The present invention relates to crimping pliers for multifunctional use.

The invention suggests equipping crimping pliers with a second tool comprising a working area, wherein the working area of the second tool is located between the two hand levers, so in the intermediate space built between the two hand levers. The second tool is not mounted or held by both hand levers but solely mounted with a first hand lever of the two hand levers. The other, second hand lever comprises a contact surface coming into contact with a contact surface of the second tool. By means of this contact of the contact surfaces of the second tool and the second hand lever activating forces for activating the second tool are transferred from the hand of the user via the hand levers to the second tool.

The present invention both covers embodiments wherein the aforementioned contact between the two contact surfaces is established during the full stroke of the hand levers and embodiments wherein the aforementioned contact between the two contact surfaces is established only in a part of the full stroke. To name one example starting from the open operating state of the hand levers in a first part of the stroke there might be no contact between the contact surface, wherein in an end region of the movement of the hand levers the contact between the contact surfaces is established. The contact between the hand lever and the tool and the design and the linkage of the contact surfaces with the other components might be chosen such that the transmission of the activating force from the hand levers to the second tool is invariant or variable and/or dependent on the opening angle of the hand levers. It is possible that the contact surfaces transmit the activating force parallel to the vector of the movement of the second hand lever at the contact surfaces. In case of a differing angle between the relative movement and the transfer of the activating force in the contact surfaces it is also possible that a relative sliding movement between the contact surfaces of the second hand lever and the second tool occurs during the pivoting movement of the hand levers.

In the inventive crimping pliers, the first tool builds the crimping tool, wherein the first tool is built with two crimping jaws. The crimping jaws are located at a head of the pliers. The crimping jaws are linked with two hand levers of the crimping pliers by any known transfer mechanism, e.g. directly linked, linked by a toggle lever mechanism, by a cam drive, a link chain, a plane-motion direct-contact mechanism and the like.

The first crimping tool and the second tool might be operated simultaneously with two separate workpieces located in the first and second tool or separately one after another for one and the same workpiece or for different workpieces.

According to the invention, it is not necessary to couple the second tool with both hand levers by suitable mounting or holding devices. Instead it is sufficient to mount the second tool with the first hand lever only, whereas the contact between the second tool and the second hand lever is solely built by the contact surfaces. This leads to a very simple but efficient design of the crimping pliers and a simple assembly process.

For crimping pliers described in the prior art section, the stroke of the first and the second tool necessarily correlate with each other and with the stroke of the hand levers. This leads to very narrow boundary conditions for the kinematics for the transfer mechanism between the hand levers and the crimping jaws on the one hand side and between the hand levers and the second tool on the other hand side. The inventive design with the second tool being solely held at the first hand lever and contacting the second hand lever during the full stroke of the hand levers or only during a part of the stroke of the hand levers increases the options for designing the kinematics and force transfer for the first and second tool.

According to another embodiment of the invention, the second tool being located between the hand levers is a stripping tool for removing an insulation of an electrical cable. For this embodiment of the invention, one and the same pliers might be used for a first working step for removing an insulation of an electrical cable in the second tool. In a subsequent second step, the stripped cable end might be crimped by the first crimping tool located at the head of the pliers with a plug, fitting and the like.

The present invention also covers embodiments where the second stripping tool only builds one single nest for stripping a cable of a known predetermined cross-section. However, the invention also covers embodiments, wherein the second stripping tool comprises a plurality of nests that might be used for removing the insulation of cables of differing cross sections or diameters.

For another embodiment of the invention, the second tool located in the intermediate space between the hand levers is a cutting tool.

According to a special embodiment of the invention, the second tool builds both a cutting tool as well as a stripping tool such that the second tool in a first working step is used for cutting the cable and subsequently used for removing the insulation from the cable. Subsequently, the first crimping tool built at the head of the pliers might be used for crimping the cut and stripped cable with a plug, fitting and the like.

It is possible that the second tool located in the intermediate space between the hand levers is fixedly mounted with the first hand lever, e.g. as an integral component of the hand levers, by screwing, by rivets, by welding and the like. However, the present invention also suggests an embodiment, where the second tool is releasably held at the first hand lever. For a releasable connection between second tool and the first hand lever, any solution known from the prior art for a releasable connection might be used. To name only one example, the second tool might be introduced into a guiding rail of a hand lever (similar to the introduction, resting or locking of a crimping die insert in a hand lever as described in DE 201 00 031 U1). Furthermore, it is possible that the second tool is releasably linked with the first hand lever with a movement of the second tool in a direction transverse to the longitudinal axis of the hand lever. To name some examples for such an embodiment, the second tool might elastically grip or snap around the first hand lever or might be rested in a transverse bore, recess or slot of the first hand lever.

The present invention also suggests not only a use of the second tool being held at the first hand lever but as an option also suggests holding a third (and/or fourth, . . . ) tool at the first hand lever or also at the second hand lever. It is also possible that besides the second tool the first hand lever also holds additional components or inserts as the crimping die insert according to DE 201 00 031 U1. These embodiments lead a multifunctional tool with a wide variety of ways to use the tool. It is possible to hold or store components of tools or the tools themselves at least one of the hand levers.

For some inventive pliers, the second tool is retransferred from a closed operating state back into an open operating state by manual operation of the user. However, the present invention also suggests using a spring element acting between the first hand lever and the second tool or in the second tool for biasing the second tool into the open operating state. For this embodiment, for an opening movement of the hand levers from the closed operating state of the second tool, the second tool automatically returns to the open operating state which is due to the return force caused by the spring element.

It is possible that the second tool is located in an axial section of the hand levers, in which the hand levers are usually not gripped by the hand of the user. In this case, there are no geometric constrictions for the dimension of the second tool perpendicular to the plane of movement of the hand levers. This is due to the fact that the second tool is located in an axial section of the hand lever, where the second tool does not come into contact with the hands of the user when actuating the hand levers. However, according to another proposal of the present invention, the second tool is (at least partially) located in the axial section of the hand levers which is gripped by at least one hand of the user during the activation of the hand levers. This embodiment relies on the assumption that despite gripping the two axial sections of the hand levers there is a sufficient intermediate space between the two axial sections of the hand levers for disposing the second tool. In this case a contact between the hand of the user and the second tool influencing the actuation of the hand levers might be avoided by dimensioning the second tool perpendicular to the plane of movement of the hand levers smaller than the extension of the hand levers in the axial sections in this direction.

According to another embodiment of the invention, the second tool might be rested or locked at least in one operating state. This rested or locked operating state might be the open operating state and/or closed operating state. This design in particular avoids undesired movements of the second tool in opening or closing direction when using the first tool for crimping a workpiece.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
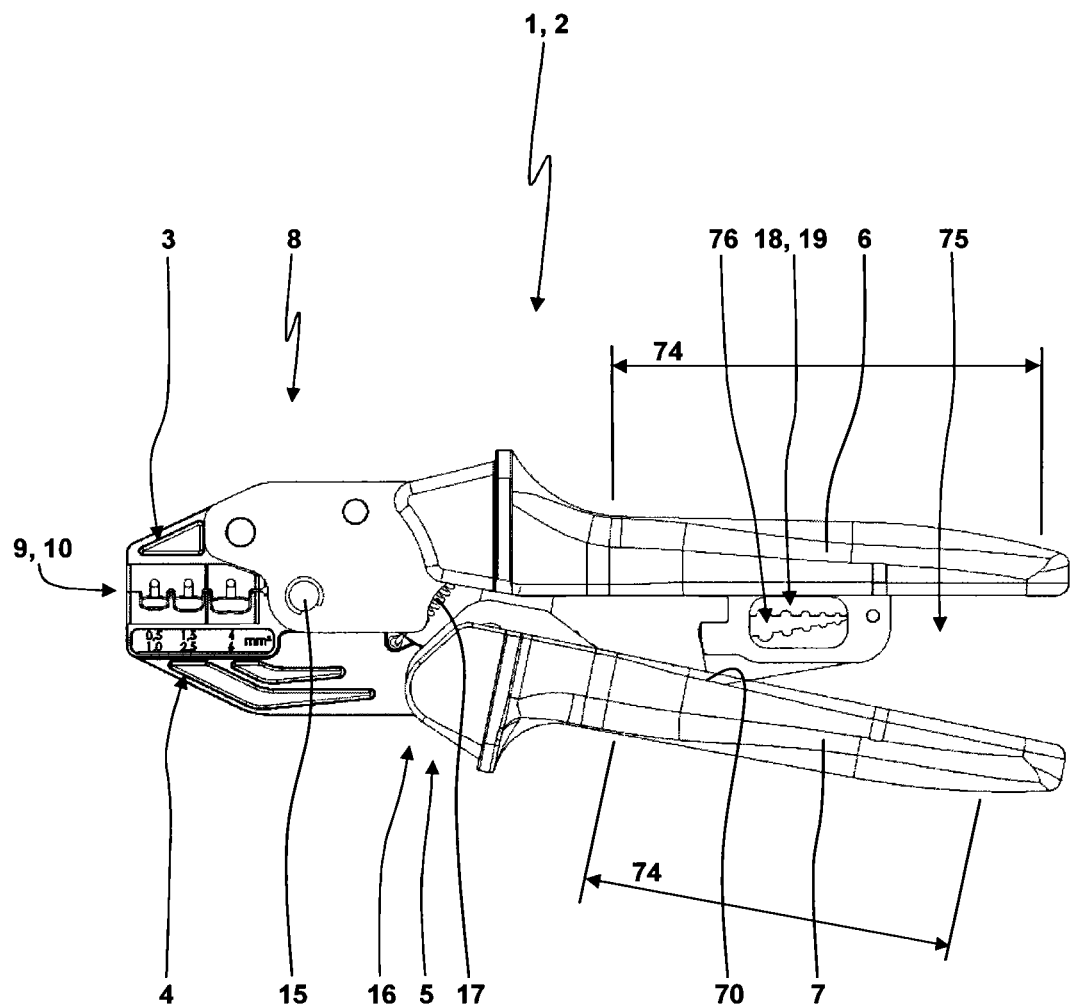
FIG. 1 shows crimping pliers in a side view, wherein the first tool for crimping is located at the head of the pliers and a second tool used for stripping a cable is located in the intermediate space between the hand levers.

Referring now in greater detail to the drawings, FIG. 1 illustrates crimping pliers 2. The pliers 2 comprise crimping jaws 3, 4. The crimping jaws 3, 4 are linked by a transfer or transmission mechanism 5 with hand levers 6, 7 such that an opening or closing movement of the hand levers 6, 7 with manually applied opening or closing forces correlate with an opening or closing movement or stroke of the crimping jaws 3, 4 with related crimping forces at the crimping jaws 3, 4. A first tool 9 located at a head 8 of the crimping pliers 2 is built with the crimping jaws 3, 4. For the shown embodiment, in the first tool 9 the crimping jaws 3, 4 support nest bodies or crimping nest inserts each building three crimping nest halves. The different crimping nest halves are adapted and contoured for crimping plugs, fittings and the like having different diameters and/or geometries.

For the shown embodiment, the transfer mechanism 5 is built with a pliers part integrally building both the hand lever 6 and the crimping jaw 3. One end of a pressure lever 12 is linked at the hand lever 6 by a joint 11. The other end of the pressure lever 12 is linked with the front end of hand lever 7 by a joint 13. As can be seen from FIG. 2, hand lever 7 comprises an end region extending from joint 11 towards the head 8 of the pliers 2. This end region is linked by a joint 14 with the crimping jaw 4. The crimping jaw 4 is pivotably linked by a joint 15 with the pliers part built with hand lever 6. Hand lever 7 together with pressure level 12 and joints 11, 13, 14 and 15 and the linkage with the crimping jaw 4 build a toggle lever mechanism 16. A pulling spring 17 linked in its end regions with hand lever 7 or the related pliers part and crimping jaw 4 biases pliers 1 into the open operating state. Between the hand levers 6, 7 a triangular intermediate space 75 is built. The opening angle and size of the intermediate space 75 changes with a relative movement of the hand levers 6, 7.

In FIG. 1 the transfer mechanism is described as a toggle lever mechanism. However, any different type of transfer mechanism might be used without departing from the scope of the present invention. To name only some examples for embodiments of other suitable transfer mechanism also crimping pliers comprising two integrally built pliers parts both building the hand levers as well as the crimping jaws as distributed by the applicant and described in the prior art section might be used. Also the use of a curved transfer mechanism for transferring forces applied by a user upon the hand levers 6, 7 to the crimping jaws 3, 4 might be used.

The present invention is also not restricted to the use of crimping pliers, wherein the crimping jaws 3, 4 are pivoted. Also the integration of the inventive features into crimping pliers, wherein the crimping jaws are moved towards each other with a translational relative movement is possible and suggested. It is also possible to integrate the present invention into crimping pliers, wherein a closing movement of the hand levers 6, 7 correlates with an opening movement of the crimping jaws 3, 4 (and the opposite movements). To name only some examples, the inventive features might be integrated into crimping pliers as described in documents U.S. Pat. Nos. 4,794,780 A, 4,892,015 A, 5,153,984 A, EP 0 471 977 B1, U.S. Pat. No. 5,187,968 A, DE 44 27 553 C2, DE 196 10 899 C1, U.S. Pat. No. 5,913,933 A, DE 197 09 639 A1, DE 197 53 436 C2, U.S. Pat. Nos. 6,053,025 A, 6,155,095 A, DE 198 34 859 C2, U.S. Pat. Nos. 6,286,358 B1, 6,289,712 B1, U.S. Pat. Nos. 6,474,130 B2, 6,612,147 B2, U.S. Pat. Nos. 6,877,228 B2, 6,910,363 B2, U.S. Pat. No. 7,155,954 B2, DE 10 2005 003 615 B3, DE 10 2005 003 617 B3, US 2009/0044410 A1, US 2008/0163664 A1, US 2009/0193942 A1, US 2009/0183547 A1, US 2009/0217791 A1, DE 10 2008 017 366 A1, DE 20 2008 003 703 U1 and DE 10 2009 001 949 A1.

Mounted with hand lever 6 of crimping pliers 1 is a second tool 18, here a stripping tool 19. The second tool 18 might be mounted with or held by hand lever 6 by any suitable holding connection or device, in particular a resting or locking unit, a screwed connection, a rested or locked bolt and the like. For the shown embodiment, the second tool 18 is connected with hand is lever 6 by a resting connection 20. In the sense of the present invention, a resting connection is any connection, wherein by an elastic deformation of a spring element, e.g. of a supporting element of a resting element as a resting nose or resting sphere, a positive lock or form fit with a resting protrusion or recess, in particular a resting groove, is produced which is released under elastic deformation of the spring element. In the sense of the present invention, a locking connection used for holding the second tool 18 at hand lever 6 is any connection holding the second tool 18 by positive fit or form fit or engaging at the hand lever 6, wherein the positive fit or form fit or engagement of the locking element is only released by plastic deformation or destruction of the locking element or other elements supporting the locking element or by manually removing the locking element or manually neutralizing the engagement of the locking element. The second tool 18 builds a working area 76. The workpiece is worked by the working area 76 and associated contact surfaces when introduced into the second tool 76.

The stripping tool 19 is in particular built from a plurality of parallel plates. For the shown embodiment, two plate-like tool parts 23, 24 are arranged between two covering plates 21, 22, wherein the covering plates 21, 22 are supported at and held by hand lever 6.

The stripping tool 19 comprises the following functional components:

two connection regions 25, 26 for releasably holding the stripping tool 19 at hand to lever 6 by use of suitable elements for holding or fixing and for fixing the position and orientation of the stripping tool 19 at the hand lever 6;

a cutting window 27, in which a workpiece, in particular a cable, is cut by the stripping tool 19;

a stripping window 28, wherein cutting edges of tool parts 23, 24 each build a plurality of nest parts. These nest parts with the closing movement of tool parts 23, 24 cut into the cover layer of the cable and combine to nests. Pulling at the cable in a direction transverse to the main plane of extension of the stripping tool 19 (drawing plane of FIGS. 4 and 5) leads to a stripping and removal of a part of the insulation of the cable.

Figure 5:
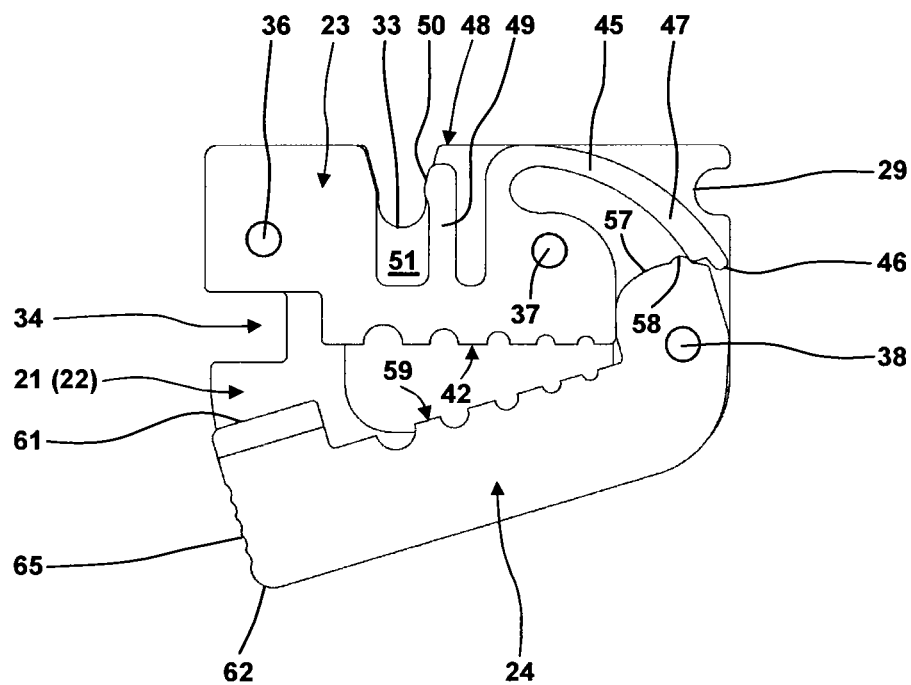
FIG. 5 shows the second tool according to FIGS. 3 and 4 with removed cover plate in an open operating state.
Figure 6:
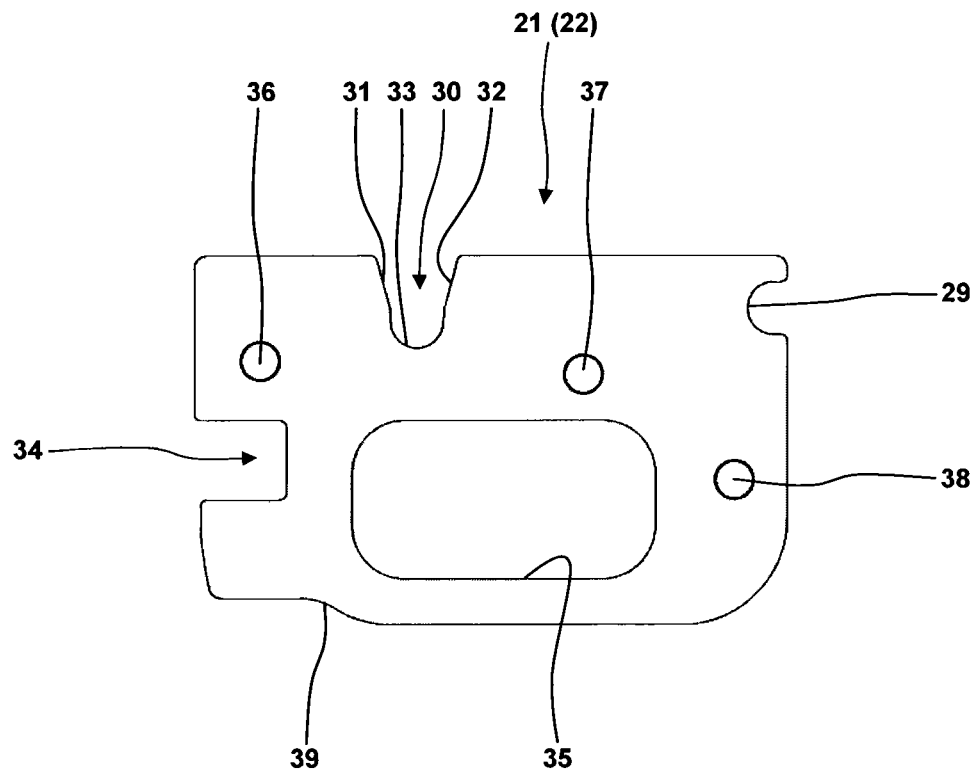
FIG. 6 shows a cover plate of a second tool according to FIGS. 3 to 5 in a side view.

FIG. 6 shows in a component drawing the two identical cover plates 21, 22. The cover plate 21 comprises a (in a first approximation) rectangular outer contour. For building the connection region 26, a U-shaped or semicircular and circumferentially open recess 29 is formed or provided at the vertical lateral edge located in FIG. 6 at the right hand side. For building the connecting region 25, the upper edge comprises a circumferentially open recess 30. Recess 30 is built with V-shaped introducing inclined surfaces 31, 32 as well as an U-shaped or semicircular base 33. At the left edge, the cover plate 21 comprises a U-shaped, rectangular and circumferentially open recess 34 for building the cutting element or knife 27. For building the stripping window 28, the cover plate 21 comprises a circumferentially closed recess 35 which for the shown embodiment is rectangular with rounded corners. The longer sides of the rectangular recess 35 have a horizontal orientation in FIGS. 4 and 5. Furthermore, the cover plate 21 comprises through-holes 36-38 having an orientation perpendicular to the drawing plane according to FIG. 6. The through-holes 36, 37 are approximately located on a horizontal axis in FIG. 6 with a distance of at least the half of the extension of the cover plate 21 in horizontal direction in FIG. 6. The through-hole 38 is located between recess 35 and the right edge of cover plate 21, approximately in the middle when seen in the height direction of recess 35. At least the lower corners of cover plate 21 are rounded. Furthermore, the cover plate 21 in the region of the lower left corner, so in diagonal direction opposing the position of recess 29, comprises a sloped surface 39 or an area of removed material with respect to the in general rectangular outer contour.

Figure 7:
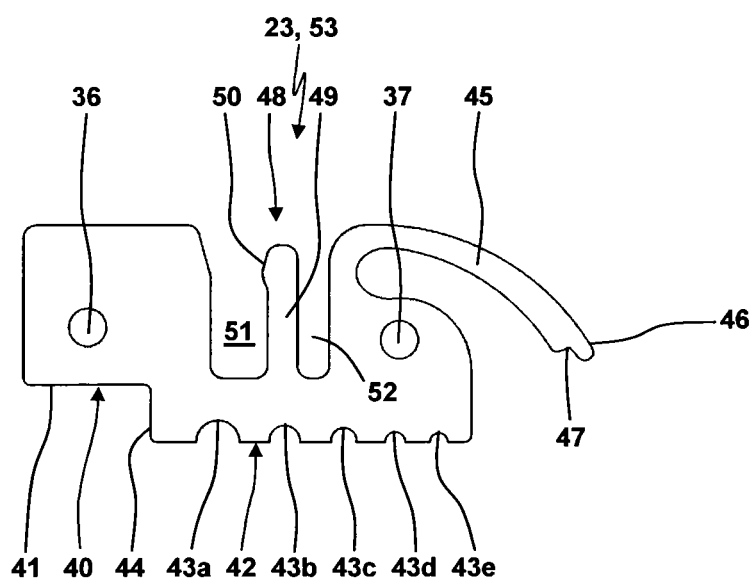
FIG. 7 shows one half of the second tool according to FIGS. 3 to 5 in a side view.

FIG. 7 shows a component drawing of tool part 23. The upper left region of tool part 23 corresponds to the upper left region of cover plate 21 with a corresponding through-hole 36, a corner with a right angle, a milled-out portion 40 limiting the tool part 23 in the lower left corner region. The distance of a horizontal leg 41 of the milled-out portion 40 from the through-hole 36 equals the distance of the corresponding leg of recess 34 of the cover plate 21 from through-hole 36 such that in the assembled state the legs are arranged in one plate. In the region of the lower edge of tool part 23, the tool part 23 forms a cutting edge 42 having a horizontal orientation in FIG. 7. The distance of the cutting edge 42 from the through-holes 36, 37 of the tool part 23 is chosen such that in the assembled state with cover plate 21 the cutting edge 42 is located approximately in the middle of the vertical extension of recess 35 in FIG. 6. The cutting edge 42 builds nest parts 43a-e each having an approximately semicircular cutting edge contour. A step or shoulder 44 with a rectangular transition to leg 41 is located between leg 41 and cutting edge 42.

A spring arm 45 extends from a base body of tool part 23. In a rough approximation the spring arm has the shape of an elephants trunk. The spring arm 45 ends in a finger 46 with associated resting groove 47. For the shown embodiment, the spring arm has a curved shape or a shape as a segment of a circle and extends from the upper edge of tool part 23 (approximately above the through-hole 37 in the assembled state) nearly up to the right edge of the stripping tool in a height which approximately equals the height of the connecting axis of the through-holes 36, 37. The elasticity of the spring arm 45 depends on the stiffness of the material used for the metal sheet building the tool part 23, on the length of the spring arm 45 and on the cross-section of the spring arm 45. Approximately in the middle of the horizontal extension of the tool part 23 a resting element 48 is built. The resting element 48 comprises a straight elongate spring arm 49 having a vertical orientation in FIG. 7. Furthermore, the resting element comprises a resting nose 59 built in the upper end region of spring arm 49. The resting nose 50 protrudes in horizontal direction from the spring arm 49 in FIG. 7 to the left side. For building the resting element 48, the tool part 23 comprises at the upper edge two parallel recesses 51, 52 open in circumferential direction at the upper edge. The recess 51 and the resting element 48 are positioned, oriented and dimensioned such that in the assembled state the tool part 23 in general does not cover the recess 30 of cover plate 21 but the resting nose 50 above base 33 enters into recess 30 with the effect that the resting nose 50 builds a narrowing portion of recess 30. Under an elastic deformation of the spring arm 49 it is possible to push the resting nose 50 in FIG. 7 elastically to the right for freeing recess 30 in the assembled state and for removing the narrowed passage of recess 30. The cutting edge 40 of tool part 23 builds a culling knife 53.

Figure 8:
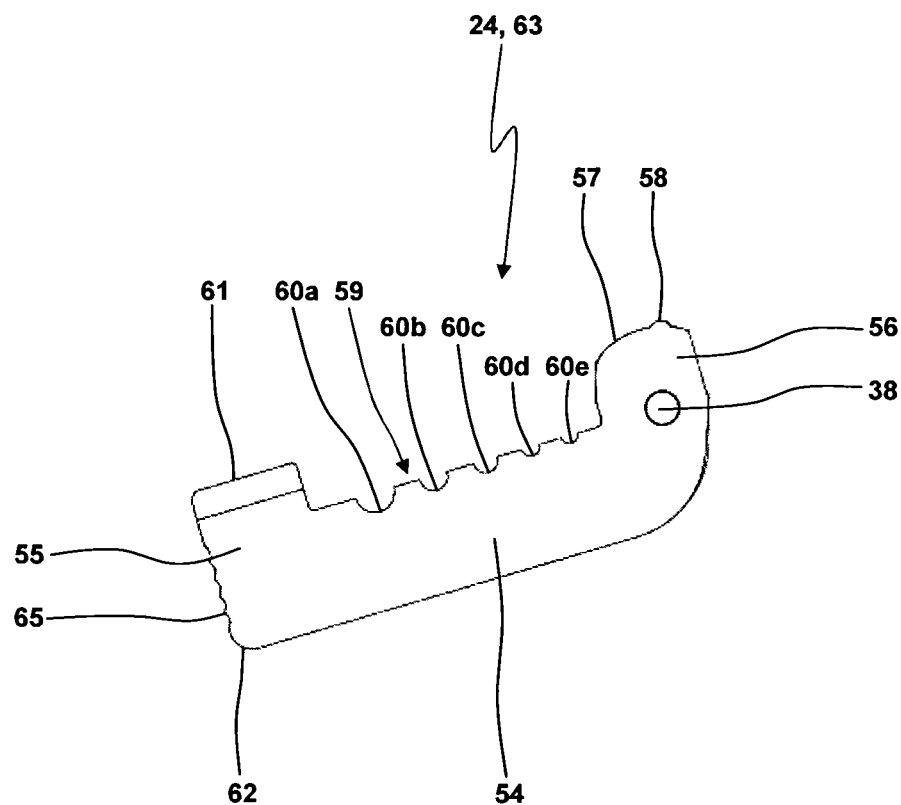
FIG. 8 shows the other half of the second tool according to FIGS. 3 to 5 in a side view.

FIG. 8 shows the other tool part 24 which is in a first approximation U-shaped or sickle-shaped and comprises a base leg 54 and two shortened side legs 55, 56 having an orientation vertical to the base leg. In the transfer region from the base leg 54 to the right side leg 56 in FIG. 8, the tool part 24 comprises a through-hole 38. The upper end region of the side leg 56 is provided with a curved or semi-circular sliding contour 57. In the assembled state, the finger 46 of tool part 23 with a pivoting movement of tool part 24 slides along the sliding contour 57. The sliding contour 57 comprises a resting nose 58. In the assembled state for a predetermined angular position of the tool part 24 the resting nose 58 rests or locks in the resting groove 47. The predetermined angular position is in particular a closed position of the stripping tool. The upper edge of the base leg 54 builds a cutting edge 59. The cutting edge 59 forms a plurality of nest parts 60a-e each having an approximately semicircular contour. In the closed state of the tool parts 23, 24, the nest halves 43, 60 combine to a plurality of nests 71a-e with different diameters or geometries. The upper end region of side leg 55 of tool part 24 builds a straight cutting edge 61 having an orientation parallel to the base leg 54. The outer edge of the side leg 55 is provided with an activating surface 65 or ribbing. The tool part 24 with its cutting edge 61 and cutting edge 59 builds a double cutting knife 63 which might be multifunctional.

Figure 3:
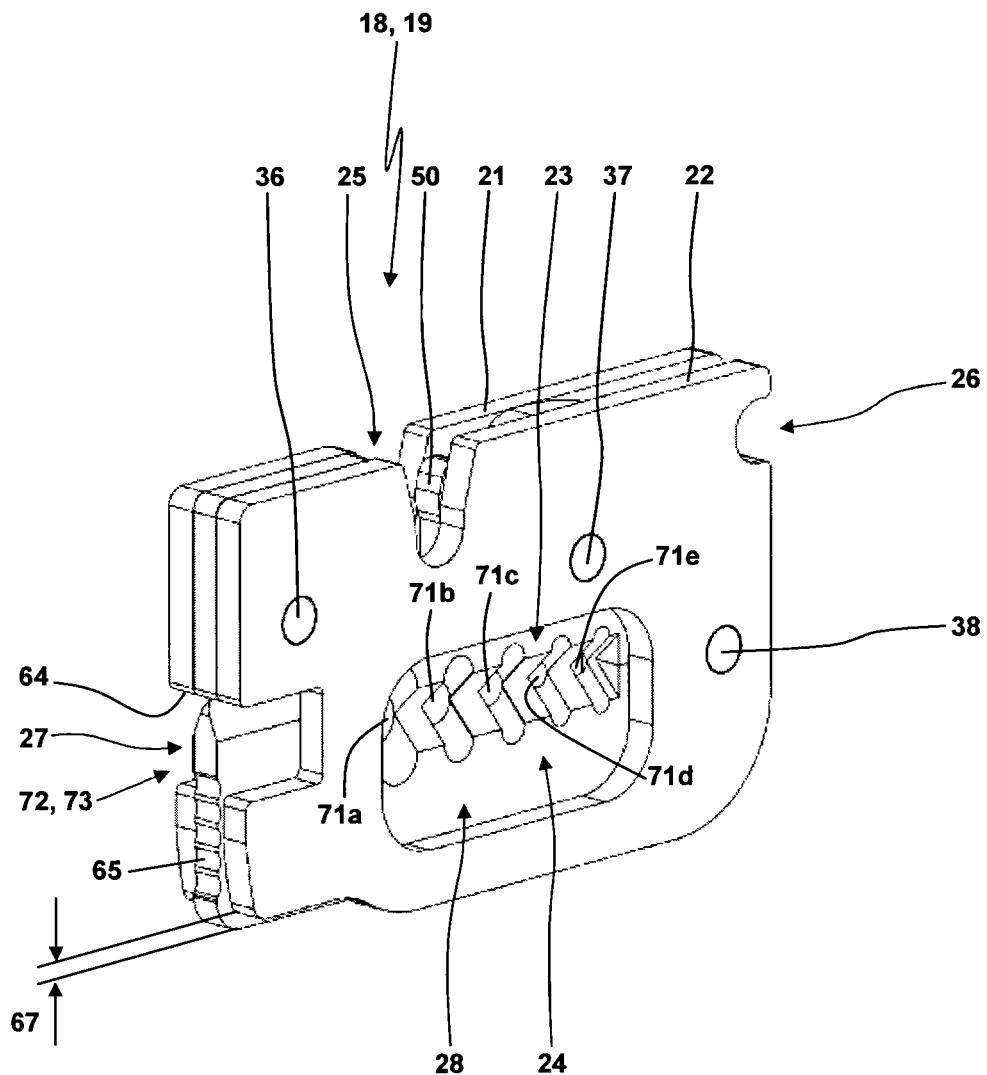
FIG. 3 is a three-dimensional view of the second tool used for stripping a cable which is an optional and removably linked part of the pliers according to FIGS. 1 and 2 and which is shown in a closed operating state.
Figure 4:
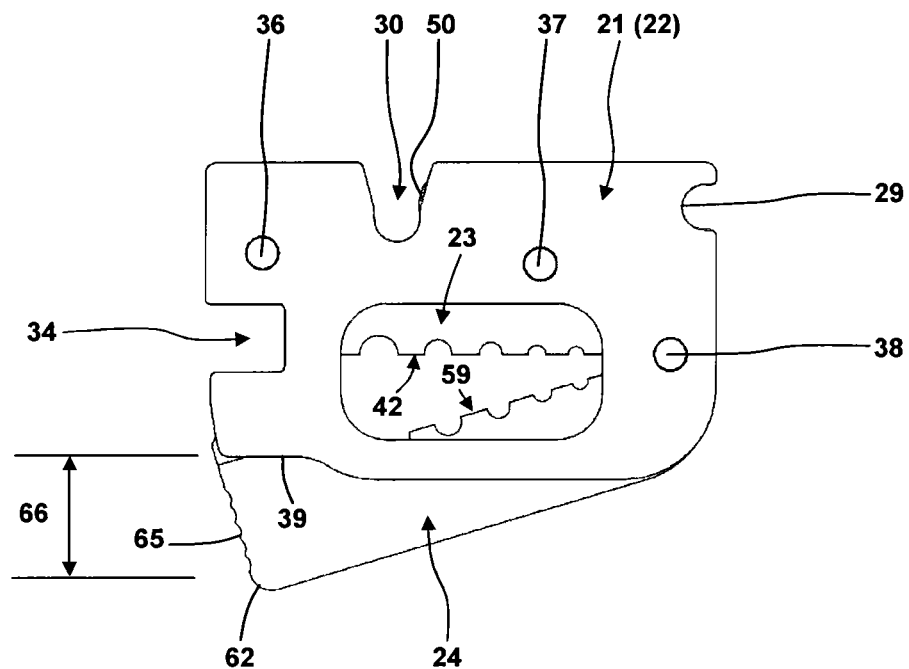
FIG. 4 shows the second tool according to FIG. 3 in a side view and an open operating state.

In the assembled state, the tool part 23 is fixedly held between the cover plates 21, 22 by straight pins, rivets and the like extending through the through-holes 36, 37. As can be seen in particular from FIGS. 3 and 5, the resting nose 50 partially closes recess 30 in upper direction. Furthermore, the recesses 34 of the cover plates 21, 22 and the leg 41 build a plain counter-surface 64. A bearing bolt extends through through-hole 38 of tool part 24 as well as through the covering plates 21, 22 such that tool part 24 is pivotably linked with respect to the cover plates 21, 22 as well as tool part 23 for a pivoting movement around this bearing bolt. FIG. 3 shows the tool part 24 pivoted into a closed operating state, whereas FIGS. 4 and 5 show the tool part 24 in an open operating state. In the open operating state, the cutting edges 42, 59 and the nest halves 43, 60 have a distance increasing with an increasing distance from the bearing bolt. The cutting edge 61 is also located remote from the counter surface 64. The lower left (rounded) corner of tool part 24 building the actuation surface 62 protrudes by a distance 66 from the cover plates 21, 22. With a pivoting movement of tool part 24 versus the closed operating state the cutting edges 42, 59 as well as the cutting edge 61 and the counter surface 64 move towards each other. When reaching the closed operating state, the aforementioned edges and surface come into contact with each other. The cutting edge 61 builds a line contact with the counter surface 64. During the aforementioned closing movement, the finger 64 slides along the sliding contour 59. In the closed operating state, the resting nose 58 of the sliding contour 57 locks into or rests with the resting groove 47. Due to the inclined surface 39 also in the closed operating state the actuation surface 62 still protrudes by a distance 67 from the cover plates 21, 22, wherein the distance 67 in the closed operating state is smaller than the distance 66 in the open operating state.

Figure 2:
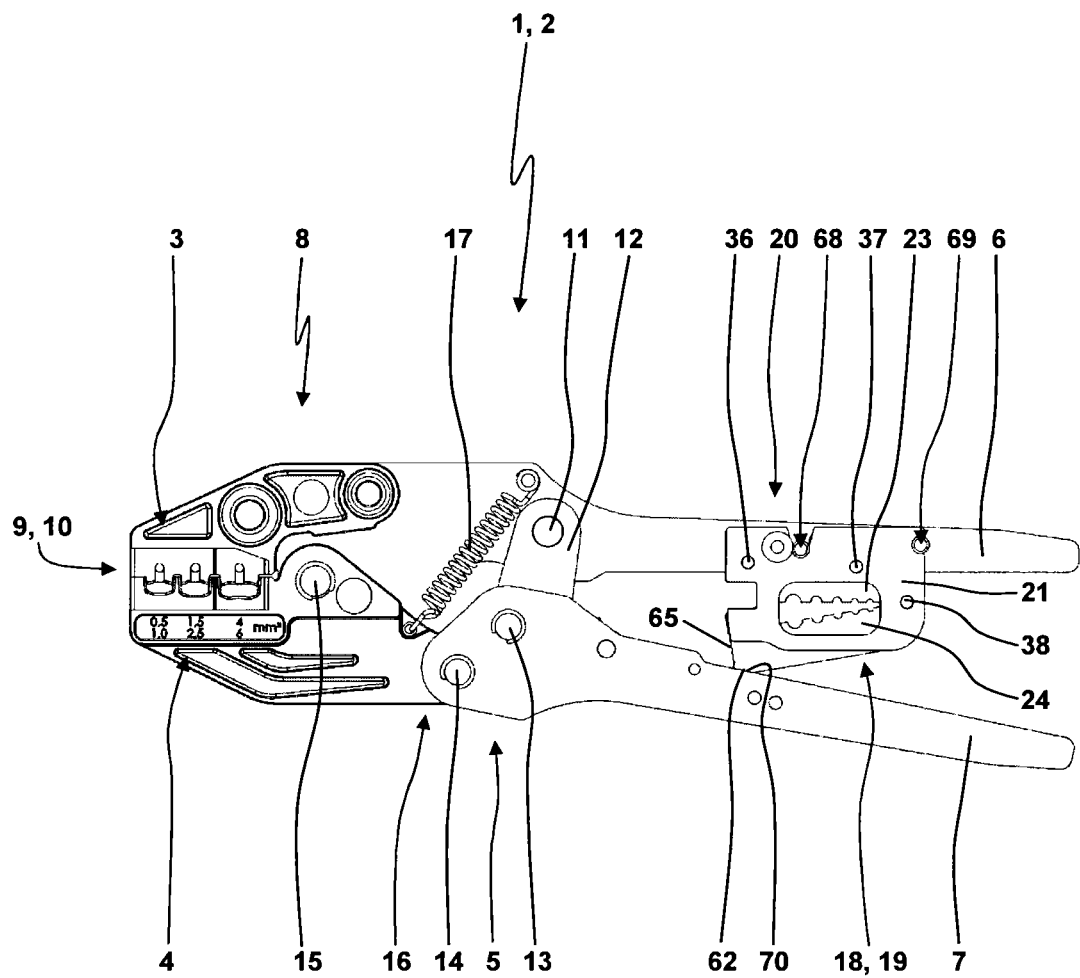
FIG. 2 shows the pliers according to FIG. 1, wherein a cover plate has been removed.

For providing the option of releasably assembling the stripping tool 19 at hand lever 6, the following is suggested: hand lever 6 comprises two holding bolts 68, 69 having an orientation transverse to the drawing plane according to FIG. 2. In case of hand lever 6 having a plate-like design the holding bolts 68, 69 might be located between two cover plates of the hand lever 6. For activating the holding or resting connection between the stripping tool 19 and hand lever 6, the stripping tool 19 is slightly pivoted with respect to the horizontal orientation shown in the figures in counter-clockwise direction and introduced from the lower side of hand lever 6 such that the connecting region 6 engages holding bolt 69. With this movement the holding bolt 69 comes into contact with the limiting surfaces of recesses 29 of the cover plates 21, 22. Subsequently, the stripping tool 19 is pivoted around the holding bolt 69 towards hand lever 6, wherein the recess 29 of the cover plates 21, 22 slides along the outer surface of the holding bolt 69. With this pivoting movement, the holding bolt 68 enters into recess 60. During this entering movement an additional guidance might be provided by the introducing inclined surfaces 31, 32. With a further pivoting and entering movement of the holding bolt 68 into recess 30, the holding bolt 68 comes into contact with the resting nose 50 and presses the resting nose 50 in lateral direction with an elastic bias of the spring arm 49. In an end position which is reached when the upper edge of the stripping tool 19 is located flush with the longitudinal axis of the hand lever 6, the holding bolt 68 comes into contact with the base 33. The resting nose 50 snaps behind the holding bolt 68 such that a removal of the holding bolt 68 from recess 30 is only possible when providing removal forces with an amount being sufficient for an elastic deformation of resting nose 50 and spring arm 49.

An actuation and/or opening of stripping tool 19 is caused as follows: The hand lever 7 comprises an actuating surface 70 facing versus the other hand lever 7 and versus the stripping tool 19. The actuating surface 70 comes into contact with the actuating surface 62 of tool part 24 such that at least for a partial stroke of the closing movement of the hand levers 6, 7 the closing movement of the tool parts 23, 24 is effected by the actuation of the hand levers 6, 7.

The cutting edge 61 and the counter surface 64 build a third tool 72, i.e. a cutting tool 73 which is actuated simultaneously with the second tool 18.

The hand levers 6, 7 are gripped by a user in the axial sections 74. The second tool 18 (and the third tool 72) might be located between these two axial sections 74. The second tool 18 has an extension in a direction vertical to the plane of movement of the hand levers 6, 7 which is in particular smaller than the extension of the hand levers in these axial sections 74. Accordingly, the second tool 18 does not come into contact with the hand of the user during the actuation of the hand levers during the crimping process with the first tool 9.

Many variations and modifications may be made to the preferred embodiments of the invention without departing substantially from the spirit and principles of the invention. All such modifications and variations are intended to be included herein within the scope of the present invention, as defined by the following claims.

We claim:
1. A crimping pliers for crimping a workpiece, comprising: first and second hand levers;

a first tool located at a head of said pliers, said first tool comprising two crimping jaws linked with said hand levers;

a second tool located between said two hand levers and being solely mounted to said first hand lever, said second tool comprising a first tool part fixed to said first hand lever and a second tool part pivotally connected to said first hand lever, said second tool part comprising an actuation surface;

wherein, during operation of said second tool, said hand levers are brought together and said second hand lever abuts said actuation surface of said second tool part to pivot said second tool part toward said first tool part and close said second tool.

2. The crimping pliers of claim 1, wherein said second tool is a stripping tool.

3. The crimping pliers of claim 2, wherein said first and second tool parts comprise a plurality of nests shaped for stripping cables of differing cross-sections.

4. The crimping pliers of claim 1, wherein said second tool is a cutting tool.

5. The crimping pliers of claim 1, wherein said second tool is releasably mounted to said first hand lever.

6. The crimping pliers of claim 1, further comprising a third tool that is mounted to at least one of said hand levers.

7. The crimping pliers of claim 1, wherein at least one insert or crimping die of said first tool is mounted to at least one hand lever.

8. The crimping pliers of claim 1, wherein a closing stroke of said first tool correlates with a closing stroke of said second tool.

9. The crimping pliers of claim 1, wherein said second tool part is biased by a spring element into an open state.

10. The crimping pliers of claim 1, wherein said second tool is located between axial sections of said hand levers during actuation of said first tool.

11. The crimping pliers of claim 9, further comprising a locking unit configured for locking said second tool part in a closed operating state.

* * * * *